J. W. STONE,

Assignor to MYERS BROS. & Co.

Tobacco Case.

No. 9,437. Reissued Oct. 26, 1880.

Attest;
J. Walter Fowler,
R. K. Evans

Inventor;
Jno. W. Stone
by A. N. Evans & Co
his attys.

N. PETERS, PHOTO-LITHOGRAPHER, WASHINGTON, D. C.

UNITED STATES PATENT OFFICE.

JOHN W. STONE, OF LYNCHBURG, VA., ASSIGNOR TO MYERS BROTHERS & CO.

TOBACCO-CASE.

SPECIFICATION forming part of Reissued Letters Patent No. 9,437, dated October 26, 1880.

Original No. 140,093, dated June 17, 1873. Application for reissue filed September 24, 1880.

*To all whom it may concern:*

Be it known that I, JOHN W. STONE, of Lynchburg, Virginia, have invented a new and useful Improvement in Tobacco-Cases, of which the following is a clear, full, and exact description, reference being had to the accompanying drawings, making a part of this specification, in which—

Figure 1:
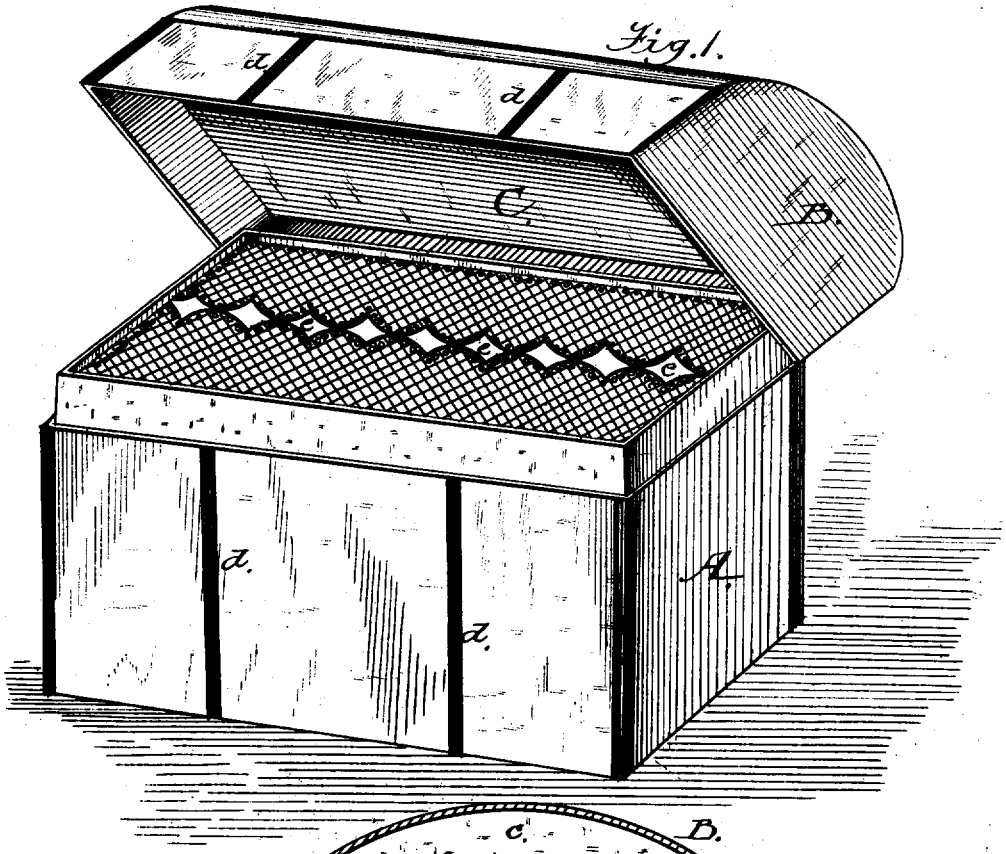
Figure 2:
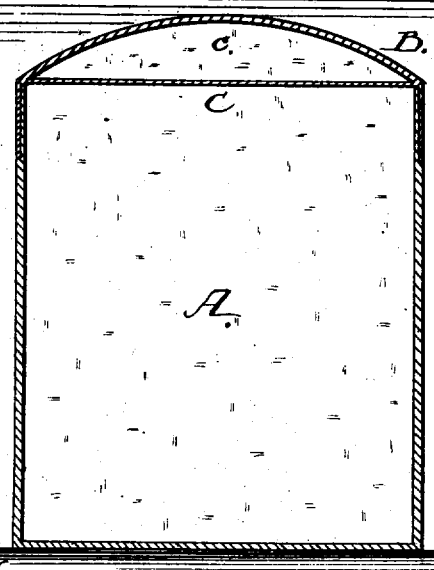

Figure 1 is a perspective view of my tobacco-case with the lid partially raised. Fig. 2 is a cross-section of the same.

My invention relates to small cases suitable for holding tobacco for the retail trade; and it consists in forming the case in the shape of a Saratoga trunk, with a stationary diaphragm fitting within the top of the trunk and shutting down closely upon the body of the trunk, by means of which the tobacco is kept pressed down within and upon a level with the upper edge of the body of the case, so that when the case is opened the tobacco will not waste, while at the same time I secure between the diaphragm and the arched top of the case an air-chamber for the better protection and preservation of the fine flavor of the tobacco.

In order to enable others to make and use my invention, I will proceed to describe the exact manner in which I have carried it out.

In the drawings, A represents the body of my tobacco-case, and B the lid. Within the lid B, I construct the diaghragm C, so that when the case is closed the diaphragm will fit closely upon the body A, as shown in Fig. 2. This construction secures the tobacco at or below a level with the upper edges of the body-frame and gives me an air-chamber between the diaphragm and the arched top of B, as shown in Fig. 2, which air-chamber has a tendency to preserve the fine flavor of the tobacco by protecting it from the external air. This intervening air-chamber *c* can, if desired, be filled with perfumery, and thus counteract the scent of the tobacco in a room where the case may be kept, and where it may not be desirable to have the smell of tobacco.

An embossed or other fancy paper, *e*, may be attached to the upper edges of the body and fold over the tobacco.

The strips or bands *d d* are placed around the outside of the case to protect its finish from injury when packed for the market.

Having thus described my invention, what I claim as new, and desire to secure by Letters Patent, is—

As a new article of manufacture, a tobacco-case constructed as described, having the body A and the top B, constructed with the fixed diaphragm C, and having the air-chamber *c*, substantially as and for the purpose set forth.

JOHN W. STONE.

Attest:
JNO. T. EDWARDS,
G. W. SMITH.